United States Patent [19]
Fritzinger

[11] Patent Number: 5,497,844
[45] Date of Patent: Mar. 12, 1996

[54] CRAWLER GEAR ASSEMBLY

[75] Inventor: Daniel D. Fritzinger, Grabill, Ind.

[73] Assignee: Mattel, Inc., El Segundo, Calif.

[21] Appl. No.: 423,298

[22] Filed: Apr. 17, 1995

[51] Int. Cl.[6] .................................................. B60K 17/14
[52] U.S. Cl. ............... 180/65.6; 74/384; 74/405; 74/462; 180/65.5; 192/20; 477/17
[58] Field of Search ................... 477/8, 15, 17; 192/20, 89.1; 74/384, 421 A, 405, 462; 180/65.1, 65.6, 65.7, 214, 216, 65.5

[56] References Cited

U.S. PATENT DOCUMENTS

| | | |
|---|---|---|
| 1,327,129 | 1/1920 | Wolff .................... 477/17 X |
| 1,681,404 | 8/1928 | Hardman .................... 477/17 |
| 3,186,506 | 6/1965 | Leach et al. . |
| 4,399,883 | 8/1983 | Todokoro . |
| 4,475,618 | 10/1984 | Kennedy et al. . |
| 4,484,649 | 11/1984 | Kennedy et al. . |
| 4,560,022 | 12/1985 | Kassai .................... 180/65.1 |
| 4,744,781 | 5/1988 | Ostendorff et al. . |
| 4,784,346 | 11/1988 | Steffan .................... 477/17 X |
| 4,984,645 | 1/1991 | White, Jr. .................... 180/65.6 |

*Primary Examiner*—Margaret A. Focarino
*Assistant Examiner*—Michael Mar
*Attorney, Agent, or Firm*—Kolisch, Hartwell, Dickinson, McCormack & Heuser

[57] ABSTRACT

A child's riding vehicle employing a unique and novel gear assembly and engagement structure includes a frame having plural wheels, and a gear assembly fixed on the frame which includes an output gear non-rotatably connected to at least one of the vehicle's wheels. A motor on the frame is mounted on an arm which is movable between an engaged position and a disengaged position, and a segment gear mounted on the frame adjacent the gear assembly engages the motor's pinion and defines a path between the engaged and disengaged position. Unique and novel gear tooth profiles are employed in both the gear assembly and the engagement structure to prevent the same from jamming during transition between the engaged and disengaged positions and vice versa.

10 Claims, 4 Drawing Sheets

5,497,844

CRAWLER GEAR ASSEMBLY

BACKGROUND AND SUMMARY OF THE INVENTION

The present invention relates to a gear assembly for children's ride-on vehicles, and more particularly to a gear assembly which automatically engages or disengages the vehicle's drive wheel or wheels when the motor is energized or de-energized.

One significant problem with children's ride-on vehicles having a small motor for driving the vehicle forward or rearward, is that when the motor is not energized, if the motor remains engaged with the vehicle's gear assembly, then when the vehicle is pushed either forward or backward, the motor and gear assembly are involuntarily driven or backdriven. This is undesirable because it unnecessarily results in wear and tear of the motor and gears. Moreover, if the motor remains engaged with the vehicle's gear assembly, a small child will often be unable to move the vehicle because of the resistance encountered when attempting to do so. Thus, the vehicle's utility would reside only when the motor is energized.

Conventional attempts have been made to solve this problem and involve using user-actuated levers or spring-loaded gears for engaging the driving gears. In the former attempts, a user must physically engage the gears with a lever for moving the vehicle. This is undesirable because a child may not understand how to operate the lever, or worse yet, the child may subject the lever to abuse thus rendering it useless. In the latter attempts, the additional moving parts (i.e., springs, moving gears, etc.) increase the chances that a spring will dislodge or slip out of position, or that one of the moving gears will malfunction thereby rendering the vehicle useless.

An example of the former attempts is U.S. Pat. No. 4,152,866 which discloses a gear assembly for use in a riding toy, having a spring-biased disc member axially joined to a selectively driven gear. The disc member is engaged by a pivotable lever which must be moved by the rider to selectively engage and disengage the driven gear with a driving gear connected to the toy's motor.

An example of the latter attempts is U.S. Pat. No. 4,484,649 which discloses a child's riding toy with an electric motor, a gear assembly, and plural driven gears selectively engaged by a driving gear which is connected by a spring to the assembly's housing and biased in a disengaged position. When the motor is energized, the force of the spring is overcome and the driving gear moves into engagement with the plural driven gears, and when the motor is de-energized the spring pulls the driving gear out of engagement with the output gear.

With the above problems in mind, it is a general object of the invention to provide a gear assembly which automatically engages the vehicle's drive wheel or wheels when the motor is energized.

It is another object of the invention to provide a children's ride-on vehicle which may be ridden and enjoyed by a child regardless of whether the motor is energized or de-energized.

It is yet another object of the invention to provide a children's ride-on vehicle which may be easily pushed forward or rearward when the motor is de-energized, without driving or back-driving the motor or other gears.

It is another object of the invention to provide a gear assembly which automatically moves a motor into engagement with a gear assembly when the motor is engaged.

It is a further object of the invention to provide a gear assembly that achieves the above results and yet is economical to manufacture by virtue of having relatively few parts, featuring components readily moldable from plastic which are rugged enough to tolerate the abuses expected in the operating environment.

In brief summary, the invention achieves these and other objects in the form of a children's riding vehicle having a unique and novel gear assembly and engagement structure associated therewith. The vehicle includes a frame having plural wheels, and a gear assembly fixed on the frame which includes an output gear non-rotatably connected to at least one of the vehicle's wheels. A motor on the frame is mounted in a motor mount on an arm which is movable between an engaged position for driving the gear assembly, and a disengaged position for allowing the vehicle's wheels to be rotated without driving or backdriving the motor. A segment gear is mounted on the frame adjacent the gear assembly and engages the motor's pinion thereby defining a path between the engaged and disengaged positions. When the motor is energized, the pinion climbs up the segment gear and eventually onto a first gear in the assembly for transmitting the driving force of the motor to the gear assembly and hence driving the vehicle. When the motor is de-energized, the pinion re-traces its path, back down the segment gear to the disengaged position, thereby allowing the vehicle's wheels to rotate freely without driving or back-driving the motor. Unique and novel gear-tooth profiles are provided to prevent the gears from jamming during transition between the engaged and disengaged positions.

These and other objects and advantages are obtained by the invention, which is described below in conjunction with the accompanying drawings.

DETAILED DESCRIPTION OF THE PREFERRED EMBODIMENT

Figure 1:
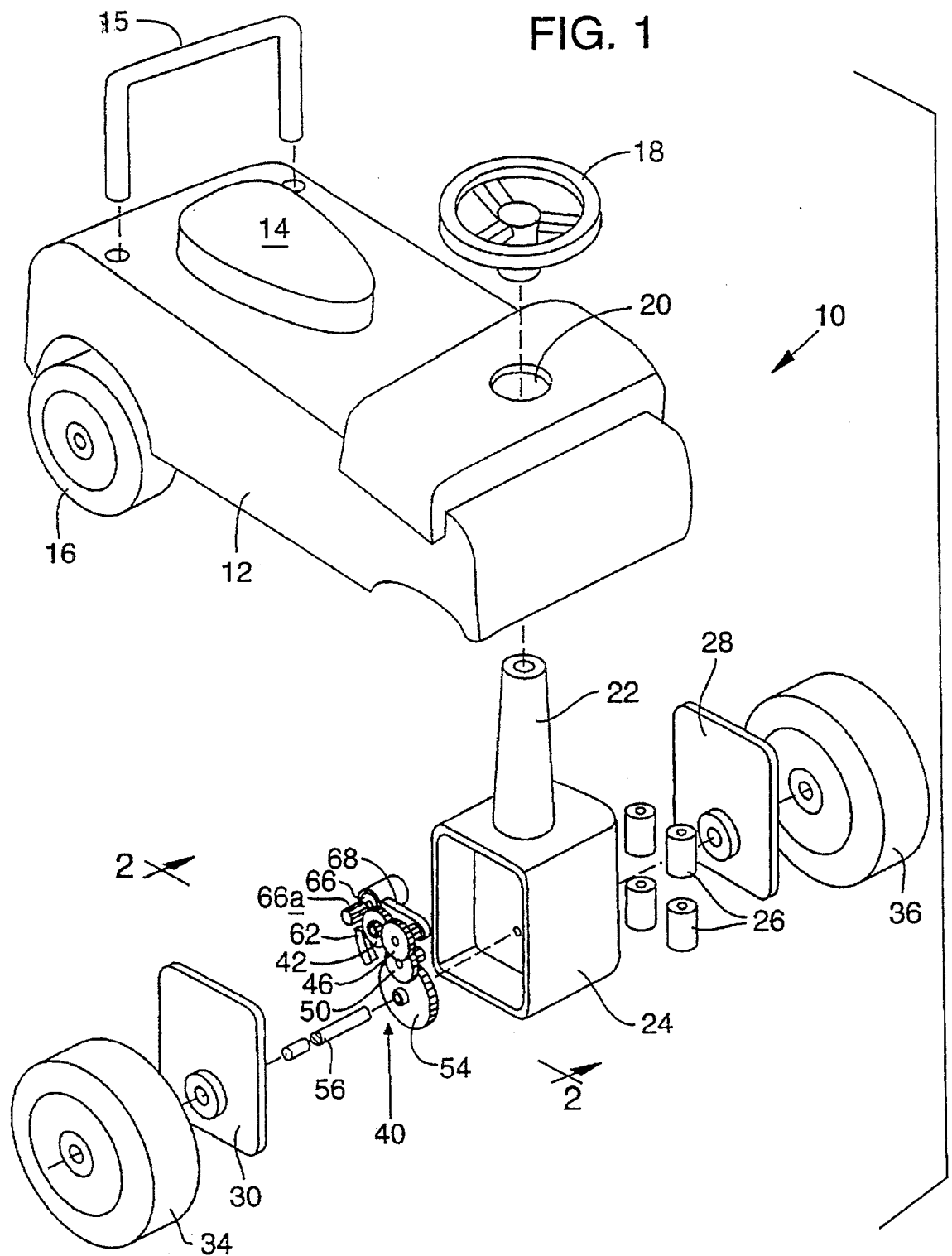
FIG. 1 is an isometric exploded view of a children's riding vehicle which employs the gear assembly and engagement structure of the present invention.

As shown in FIG. 1, a child's riding vehicle utilizing a gear assembly according to the present invention is generally indicated at 10, and includes a frame 12 having a seat 14, a U-shaped support bar 15 attached to the seat, and back wheels 16, only one of which is shown.

A steering wheel 18 is mounted to a steering column 22 which is received through an aperture 20 in frame 12. Joined to the bottom portion of steering column 22 and mounted on the frame is a gear housing 24 molded from durable plastic. Housing 24 defines a gear box, and inside of the gear box is a gear assembly indicated generally at 40. Housing 24 holds plural batteries 26 for powering the vehicle's motor, and both the batteries 26 and gear assembly 40 are enclosed therein by suitable side portions 28, 30 respectively. As shown in FIG. 1, the vehicle includes two front wheels 34, 36 which are selectively driven by the motor described in more detail below.

Figure 2:
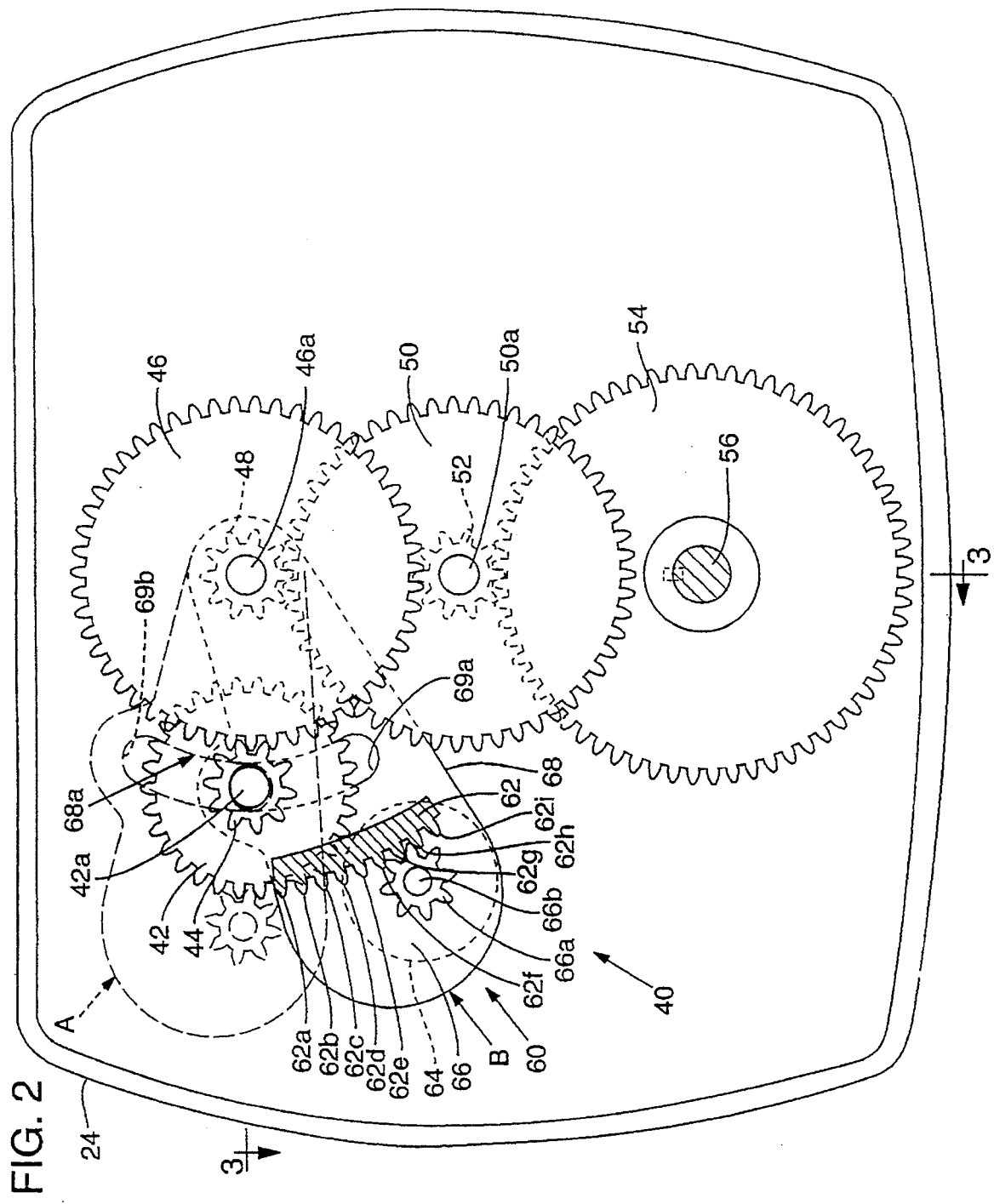
FIG. 2 is a side elevation of the gear assembly and engagement structure according to the present invention taken along line 2—2 in FIG. 1, showing an engaged and disengaged position.
Figure 3:
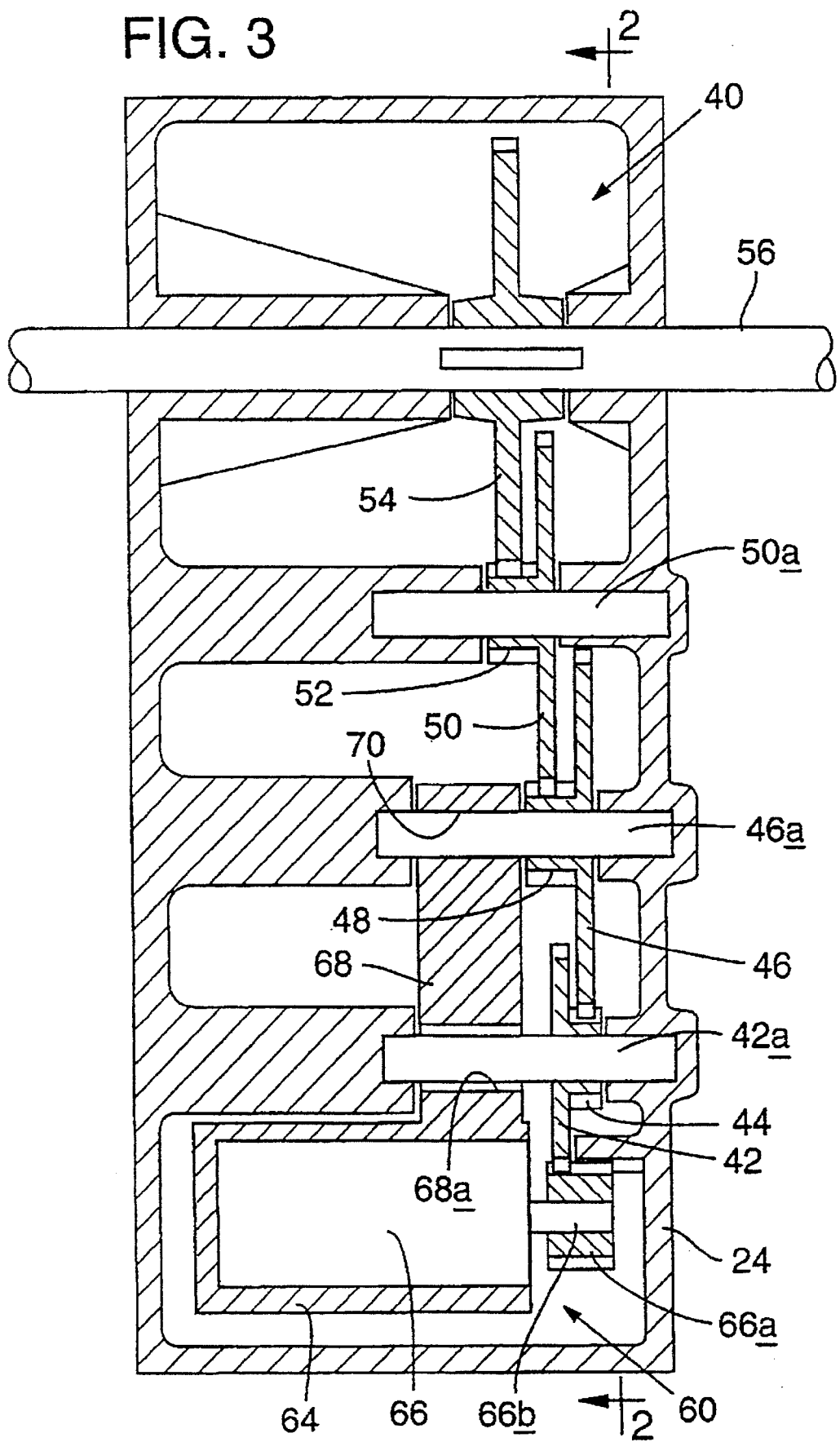
FIG. 3 is a top view of the gear assembly and engagement structure of the present invention, taken along line 3—3 in FIG. 2.

FIGS. 2 and 3 show the gear assembly generally at 40 where the assembly may be seen to include a first gear 42 with a concentric pinion 44 in driving contact with a second gear 46. Second gear 46 has a concentric pinion 48 which is in driving contact with a third gear 50 having a concentric pinion 52 in driving contact with an output gear 54. As shown in FIG. 3, output gear 54 is non-rotatably connected to an output shaft or axle 56 which in turn is connected to the vehicle's wheels 34, 36 (FIG. 1). Each of the gears 42, 46, 50 are conventionally mounted in housing 24 on gear pins 42a, 46a, and 50a, respectively.

Engagement structure generally indicated at 60 includes a segment gear 62 (FIG. 2), a motor mount 64 for housing a motor 66, and an arm 68 mounted on the frame and pivotable about gear pin 46a as shown in FIG. 2. Motor 66 includes a pinion 66a non-rotatably mounted on a shaft 66b. It will be appreciated that motor 66 may be mounted in motor mount 64 on arm 68 in any suitable non-rotatable fashion.

As shown in FIG. 2, arm 68 is pivotally mounted in gear housing 24 on frame 12 and movable between a first position A (shown in dashed lines) for engaging gear assembly 40, and a second position B disengaging the gear assembly and allowing output gear 54 and the vehicle's wheels 34, 36 to freely rotate without driving or back-driving the motor. Preferably, arm 68 includes a bore 70 most easily seen in FIG. 3, and pin 46a passes through the bore as shown, providing a pivot axis for arm 68 between first and second positions A, B described above.

Segment gear 62 (FIG. 2) enables motor 66 to move between the first and second positions in the following way. As shown in FIG. 2, segment gear 62 includes plural gear teeth 62a through 62i and motor pinion 66a engages the teeth. It will be appreciated that the segment gear defines a path between the first and second positions described above, and that when motor 66 is energized, pinion 66a rotates in a clockwise direction, engages plural teeth 62a through 62i on segment gear 62, and begins to crawl upwardly along the defined path, away from second position B (corresponding to the disengaged position) and toward first position A (corresponding to the engaged position). Segment gear 62 may be seen to have an arcuate construction for accommodating the radial movement of arm 68 about pin 46a. It will be appreciated that segment gear 62 may be viewed as a sub-portion of a larger gear which is not shown, but if shown, would be centered at pin 46a and have a radius which is the same as the distance between pins 42a, 46a plus the radius of gear 42. A generally arcuate slot 68a is provided in arm 68 (shown also in FIG. 3) and includes a bottom 69a and a top 69b, thereby ensuring that gear pin 42a of first gear 42 remains substantially free from interference during movement of arm 68 between the first and second positions. Bottom 69a and top 69b define stops, limiting respectively, the upward and downward travel of arm 68.

When the motor is energized and pinion 66a rotates and engages segment gear 62, climbing upwardly therealong toward first gear 42 as described above, the motor and pinion reach a point at the top of segment gear 62 where the pinion climbs off the segment gear, continuing its radially upward travel, and onto first gear 42. With the upward travel of the arm limited by bottom 69a of slot 68a, the motor begins to drive first gear 42 and hence gear assembly 40. When the motor is de-energized, pinion 66a stops rotating and the weight of the motor and arm cause the arm to travel downwardly along the segment gear, toward the second position. It is in the second position that the vehicle's wheels may freely rotate without driving or backdriving the motor. This enables a child to easily push the vehicle forward or rearward when the motor is not energized, corresponding to when a child sits on the vehicle and scoots it across the floor using their legs for locomotion, or stands behind and pushes the vehicle using bar 15 for support.

Figure 4:
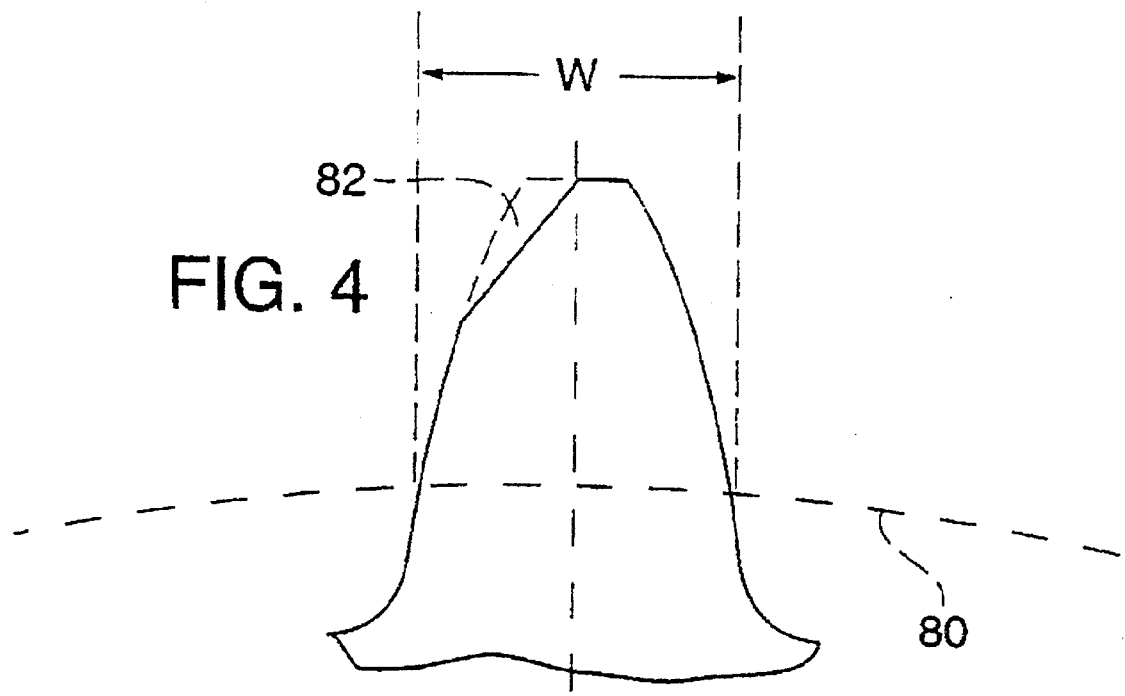
FIG. 4 is a gear tooth profile of one of the similarly-profiled teeth comprising the first gear in the gear assembly of the present invention.
Figure 5:
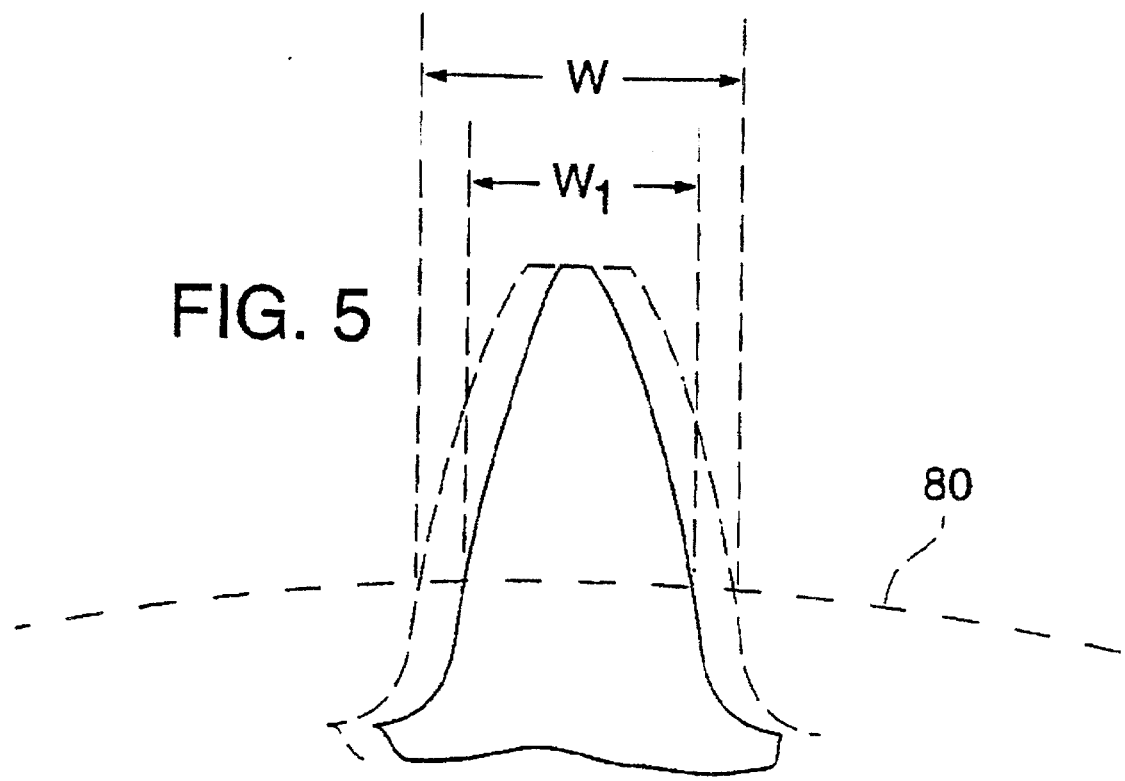
FIG. 5 is a gear tooth profile of one of the similarly-profiled gear teeth comprising the engagement structure and motor pinion described below.

FIG. 4 shows a particular non-symmetrical gear tooth profile for the teeth comprising first gear 42, and FIG. 5 shows a particular gear tooth profile for the teeth comprising both motor pinion 66a and segment gear 62. The profiles, shown in solid lines and described below, have been found most suitable for practicing the invention insofar as preventing jamming of the gears when pinion 66a climbs on or off first gear 42.

Dashed line 80 in FIGS. 4 and 5 represents a line, a portion of which defines the width of each gear tooth. This parameter, as those of skill in the art will understand, is referred to as the circular tooth thickness. As shown, the circular tooth thickness of the gear teeth comprising first gear 42 (FIG. 4) is W and may be considered to be of a "standard thickness," as that term is defined by the American Gear Manufacturers Association, and understood by those of skill in the art. A small corner portion 82 has been removed from the left top portion of the tooth. Indeed, each gear tooth of first gear 42 has an identically removed portion, the purpose of which will become apparent below.

FIG. 5 shows that the circular tooth thicknesses of the gear teeth in both the segment gear and motor pinion have been reduced from a standard width W, to a non-standard width W, resulting in a more pointed tooth. Those of skill will understand that such a construction is desirable to prevent jamming at the point pinion 66a climbs off (on) segment gear 62 and on (from) first gear 42. More specifically, it will be appreciated that with the standard flat tip of each tooth of gear 42 altered by having removed therefrom a portion 82, there is less of a chance of the gear teeth jamming when motor 66 and pinion 66a transition between the disengaged and engaged positions. For example, when transitioning from the disengaged position to the engaged position, and more specifically when pinion 66a climbs off segment gear 62 and onto first gear 42, the combination and interaction of the profile-reduced pointed teeth of pinion 66a and the profile-modified teeth of first gear 42 significantly reduces the probability of jamming therebetween. This becomes especially significant when one considers that the teeth of gear 42 and tooth 62a of segment gear 62 may not always line up to be coincidental, as viewed in FIG. 2. Similarly, when transitioning from the engaged position to the disengaged position, and more specifically when pinion 66a descends onto segment gear 62, the combination and interaction discussed above greatly reduces the probability of the gear tooth tips jamming. Moreover, even in the event of an inadvertent jam, the reduced area of the tooth tip greatly increases the chances that the gears will be unjammed by even slight agitation of the vehicle, such as when a child scoots the vehicle across the floor using their legs for locomotion.

The gear parameters which have been found most suitable in practicing the invention are as follows. All of the gears and pinions preferably have diametral pitches of 32, and manufactured pressure angles of 20°. The number of teeth on each gear or pinion is preferably as follows: 41 teeth on gear 42; 15 teeth on pinion 44; 15 teeth on input pinion 66a; 67 teeth on gears 46, 50; 15 teeth on pinions 48, 52; and 79 teeth on gear 54. Although the above specific parameters have been found preferable, gears and pinions utilizing other parameters are within the scope of the invention.

Briefly summarizing, a child's riding vehicle employing a unique and novel gear assembly and engagement structure has just been described. The vehicle includes a frame having plural wheels, and a gear assembly fixed on the frame which includes an output gear non-rotatably connected to at least one of the vehicle's wheels. A motor on the frame is mounted on an arm which is movable between an engaged position and a disengaged position, and a segment gear mounted on the frame adjacent the gear assembly engages the motor's pinion and defines a path between the engaged and disengaged position. When the motor is energized, the pinion climbs up the segment gear and eventually onto the first gear for transmitting the driving force of the motor to the gear assembly and driving the vehicle. When the motor is de-energized, the pinion re-traces its path, back down the segment gear to the disengaged position, thereby allowing the vehicle's wheels to rotate freely without driving or back-driving the motor. Unique and novel tooth profiles are employed, as described above, to prevent jamming of the gears during transition between the engaged and disengaged positions and vice versa.

Although a preferred embodiment of the invention has been described herein, it should be appreciated that variations and modifications may be made thereto without departing from the scope and content of the claims.

It is claimed and desired to secure by Letters Patent:

1. A child's riding vehicle comprising:

a frame;

plural wheels rotatably mounted on the frame;

a gear assembly fixed on the frame which includes an output gear non-rotatably connected to at least one of the vehicle's wheels;

an electric motor including a driven motor pinion, the motor being movably mounted on the frame for movement between a first position in which the motor pinion is in driving engagement with the gear assembly for driving the output gear, and a second position in which the motor pinion is disengaged from the gear assembly for allowing the output gear and the vehicle's wheels to freely rotate without driving or back-driving the motor; and an engagement gear mounted on the frame adjacent the gear assembly for operatively engaging the motor pinion and defining a path of travel for the motor pinion between the first and second positions, whereby when the motor is activated the pinion engages the engagement gear and the motor automatically climbs therealong to the first position, and when deactivated, the motor automatically moves along the engagement gear under the influence of gravity to the second position.

2. The vehicle of claim 1, wherein the engagement gear is a segment gear which includes plural gear teeth for engaging the motor's pinion and enabling the motor to climb therealong between the first and second positions.

3. The vehicle of claim 2, wherein the gear assembly includes a first gear mounted adjacent the segment gear for receiving the driving force of the motor pinion, and wherein the first gear includes plural teeth, each of which having a non-symmetrical gear-tooth profile as viewed from a point on the first gear's rotation axis, such profiling for preventing the first gear's teeth from jamming with the motor pinion when the motor moves between the first and second positions.

4. The vehicle of claim 3, wherein the motor pinion includes gear teeth with pointed profiles for engaging the plural teeth on the first gear for preventing jamming therewith when the motor moves between the first and second positions.

5. The vehicle of claim 4, wherein the segment gear's teeth have pointed profiles for preventing jamming with the motor pinion.

6. The vehicle of claim 2, wherein the segment gear is generally arcuate.

7. The vehicle of claim 1 further comprising a motor mount pivotally mounted on the frame for supporting the motor and moving the motor between the first and second positions.

8. A child's riding vehicle comprising:

a frame;

plural wheels rotatably mounted on the frame;

a gear assembly fixed on the frame which includes a first gear drivingly connected to an output gear which in turn is non-rotatably connected to at least one of the vehicle's wheels;

a motor having a pinion rotatably connected thereto, the motor being movably mounted on the frame and movable between a first position with the pinion engaging the first gear and transmitting the driving force of the motor to the gear assembly for driving the vehicle, and a second position with the pinion being disengaged from the first gear so that the vehicle's wheels may freely rotate without driving or back-driving the motor; and engagement structure mounted on the frame adjacent the gear assembly for providing a movable mount for the motor and defining a path between the first and second positions, the engagement structure including a segment gear having plural gear teeth thereon for engaging the motor pinion, the segment gear defining a path of travel for the motor pinion between the first and second positions wherein the motor is automatically moved to the first position when activated, and is moved to the second position by gravity when the motor is deactivated.

9. The vehicle of claim 8, wherein the engagement structure includes a pivotally mounted arm for supporting the motor and moving the motor between the first and second positions.

10. The vehicle of claim 8, wherein the first gear includes plural gear teeth, each of which having a portion of each tip removed for preventing jamming with the motor pinion when the motor moves between the first and second positions.

* * * * *